United States Patent
Staver et al.

(10) Patent No.: US 6,487,625 B1
(45) Date of Patent: Nov. 26, 2002

(54) CIRCUIT AND METHOD FOR ACHIEVING HOLD TIME COMPATABILITY BETWEEN DATA-SOURCE DEVICES COUPLED TO A DATA-REQUESTING DEVICE THROUGH A DATA BUS

(75) Inventors: Daniel Arthur Staver, Scotia, NY (US); Paul Andrew Frank, Albany, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/478,133

(22) Filed: Jan. 5, 2000

(51) Int. Cl.$^7$ .............................. G06F 13/38; H04L 7/00
(52) U.S. Cl. ..................... 710/305; 327/153; 327/93
(58) Field of Search ................................. 710/100, 300, 710/305; 327/141, 91, 97, 94, 93, 153

(56) References Cited

U.S. PATENT DOCUMENTS

| | | | |
|---|---|---|---|
| 3,769,528 A | * | 10/1973 | Chu et al. ............... 327/109 |
| 5,471,159 A | | 11/1995 | Stuebing et al. |
| 5,517,532 A | * | 5/1996 | Reymond ............... 327/141 |
| 5,555,187 A | | 9/1996 | Spyrou |
| 5,828,872 A | | 10/1998 | Watkins |
| H1796 H | | 7/1999 | Srivatsa et al. |
| 5,949,258 A | | 9/1999 | Jeong |
| 6,182,230 B1 | * | 1/2001 | Gholami et al. ............ 713/300 |
| 6,310,498 B1 | * | 10/2001 | Larsson ................... 327/141 |
| 6,356,967 B1 | * | 3/2002 | Vaisanen et al. ........... 370/402 |

* cited by examiner

*Primary Examiner*—Xuan M. Thai
(74) *Attorney, Agent, or Firm*—Jill M. Breedlove; Enrique J. Mora; Beusse, Brownlee, Bowdoin & Wolter, PA

(57) ABSTRACT

A circuit and method for achieving hold time compatibility between data-source devices coupled to a data-requesting device through a data bus is provided. The circuit is made up of an impedance coupled to the data bus, and the value of that impedance is selected, based on a respective capacitance in the data bus, to introduce a predetermined delay to data passing therethrough.

23 Claims, 1 Drawing Sheet

US 6,487,625 B1

CIRCUIT AND METHOD FOR ACHIEVING HOLD TIME COMPATABILITY BETWEEN DATA-SOURCE DEVICES COUPLED TO A DATA-REQUESTING DEVICE THROUGH A DATA BUS

BACKGROUND OF THE INVENTION

The present invention generally relates to the field of computing, data processing and digital communications. More particularly, the described invention discloses a circuit and method for achieving hold time compatibility between datasource devices coupled to a data-requesting device, e.g., a processor, through a data bus.

Rapidly increasing information traffic as well as increased computational needs continue to push bus and processor limits as users demand faster computers and higher data transfer rates. As processing times increase, clock frequencies increase and clock periods decrease. These shorter clock cycles may result in problems when logic circuit processing speeds approach that of a clock cycle.

The correct operation of a logic circuit depends on certain timing criteria being satisfied. FIG. 1 depicts some exemplary timing criteria which generally needs to be satisfied. One criterion is that a sufficient setup time 104 is available, and a subsequent sufficient hold time 108 is available. The setup time 104 is the amount of time preceding the change of state 112 in a control signal 116, typically a clock transition, in which a data signal 120 must be kept steady in order for a logic circuit to properly process the data. The hold time 108 is the amount of time following the change in a control signal 112, again typically a clock transition 112, in which the data signal 120 must be held steady for a logic circuit to properly process the signal.

As further described below, the present invention addresses the need to have interface architectures that reliably and inexpensively provide compatible hold time between devices that may be coupled to a data-requesting device, e.g., a digital signal processor (DSP), through a data bus. For example, in microprocessor-based systems and, particularly, in systems using relatively fast integrated circuit (IC) digital signal processors (DSPs), the timing criteria should be satisfied by any hardware interfaces between the microprocessor or DSP and other devices connected to the bus, such as devices that source data to the DSP. As an example of the foregoing, a typical relatively fast, and presently commercially available DSP, such as Texas Instruments DSP model TMS320LC206-80 and others, may demand a hold time of approximately two ns when reading data signals from devices that are coupled to the data bus to source such data signals. Typical data-source devices, such as flash memories, etc., are specified by their respective manufacturers to have approximately zero ns hold time. In order to overcome the resulting conflict in the hold time, it is known to use IC bi-directional buffers to isolate the devices from the DSP so as to provide the requisite hold time. Unfortunately, use of such IC buffers adds to the complexity and cost of the interfacing architecture. For example, in a 32-bit parallel processor, each data line requires one respective IC buffer and consequently the interfacing hardware requires a total of at least 32 of such IC buffers. Thus, it is desired to provide a lowercost hardware solution to any data hold time conflicts that may arise in a processing system by eliminating use of higher cost IC components for lower cost passive or discrete components.

BRIEF SUMMARY OF THE INVENTION

Generally speaking the present invention fulfills the foregoing needs by providing a circuit for achieving hold time compatibility between data-source devices coupled to a data-requesting device, e.g., a processor through a data bus. The circuit comprises an impedance coupled to the data bus, and the value of that impedance is selected, based on a respective capacitance in the data bus, to introduce a predetermined delay to data passing therethrough.

The present invention further fulfills the foregoing needs by providing a method for achieving hold time compatibility between data-source devices coupled to a data-requesting device, e.g., a processor through a data bus. The method allows for coupling an impedance to the data bus, and for selecting the value of that impedance, based on a respective capacitance in the data bus, to introduce a predetermined delay to data passing therethrough.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
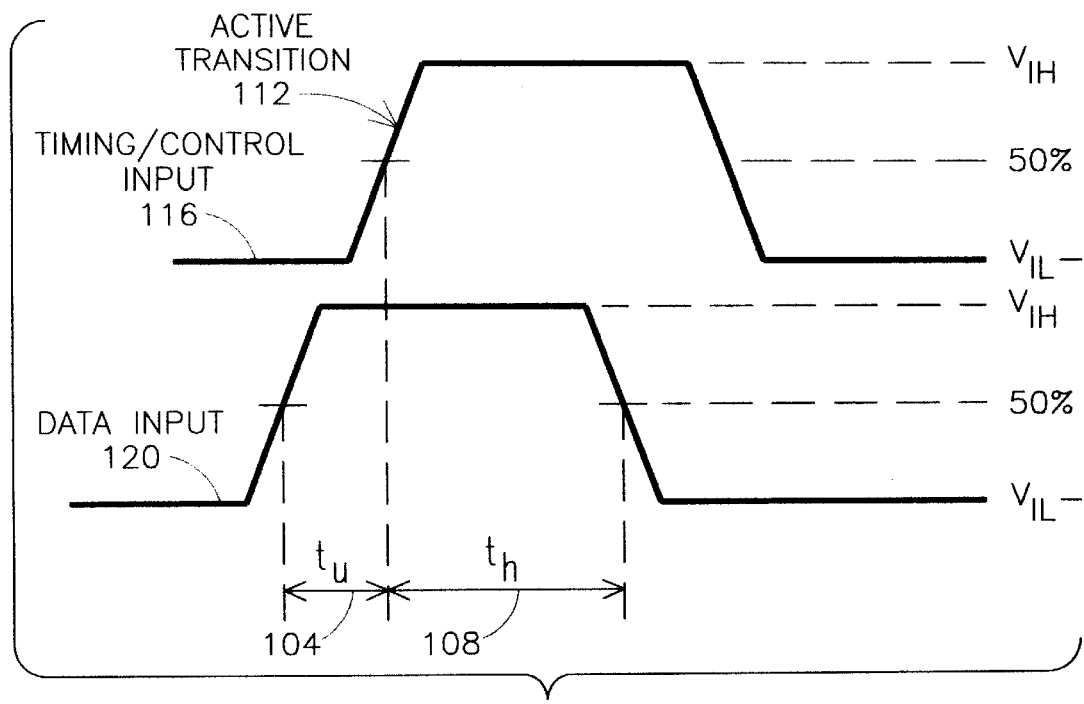
FIG. 1 shows timing waveforms between a clock and a data signal.

FIG. 1 shows exemplary waveforms illustrative of some timing needs of a logic circuit. A control or clock circuit generates a timing or control input signal 112 which controls operation of the logic circuit. An input signal 120, being operated on is also shown. The input signal 120 may be generated by either a data-source device or by a feed-back path of the logic circuit. As will be appreciated by those skilled in the art, each input signal 120, has a setup time 104 and a hold time 108. The setup time 104 is the time interval preceding a controlling instant (such as a rising edge of the clock, or an active transition as shown in FIG. 1) in which the data input signal 120 is stable. The hold time 108 is the time interval following the controlling instant in which the data input signal 120 is stable.

Figure 2:
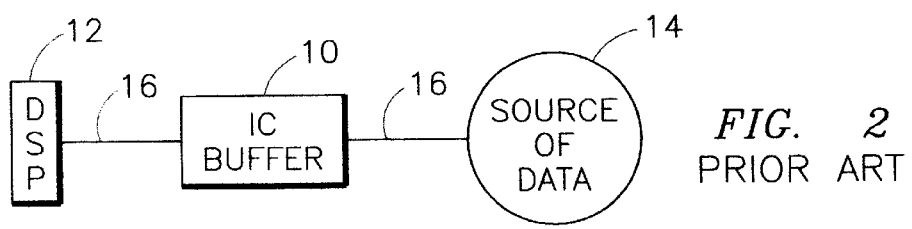
FIG. 2 shows a prior art interface that uses an IC buffer to resolve hold time conflicts.

As suggested above, FIG. 2 shows a prior art IC interface buffer 10, i.e., a bidirectional digital buffer, that is interposed between a relatively fast DSP 12 and a source of data 14, e.g., a flash memory, logic circuit, etc., coupled through a data bus 16 to correct for hold time conflicts between DSP 12 and data source 14. Although the above interface may provide some relief to avoid hold time incompatibilities, since the price of such buffer may presently be in the order of at least $0.50 to one US dollar or more, which is not an insignificant cost for applications that are becoming increasingly sensitive to the pricing demands of globally competitive markets, it would be desirable to provide a circuit interface that more reliably and economically solves any hold time conflicts therein.

Figure 3:
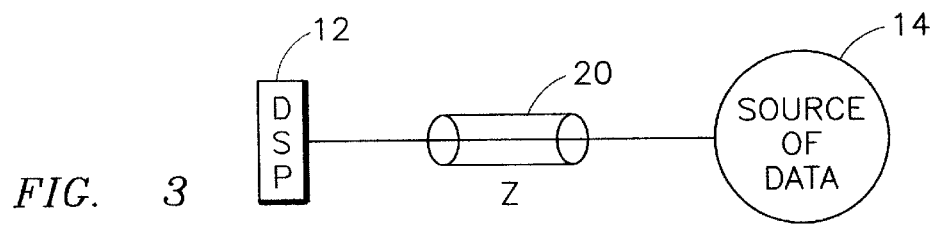
FIG. 3 shows a schematic illustrating an embodiment of the circuit impedance of the present invention.

FIG. 3 shows an exemplary embodiment of the present invention wherein an impedance 20, symbolically represented by the letter Z is electrically coupled to the data bus 16 to introduce a predetermined delay to the data passing therethrough. The value of the impedance is selected, based on a respective capacitance in the data bus, to introduce the predetermined delay. Preferably, the predetermined delay is selected sufficiently long to avoid any conflicts in the hold time between DSP 12 and data source 14. By estimating and/or modeling the load capacitance of any devices coupled to the data bus, as well as the intrinsic capacitance of the bus wiring itself, one can use that load capacitance to make a lag network by inserting an appropriately chosen impedance value, (e.g., a resistance value) between the DSP and the datasource device. It will be appreciated by those skilled in the art that the estimating and/or modeling of the load capacitance in the bus may be accomplished using any standard estimating and/or modeling tool such as are commonly available and wellunderstood in the art of data bus design. It will be further appreciated by those skilled in the art that the lag network need not be limited to a resistive/capacitance combination being that other impedance combinations including an inductive impedance combination could be readily implemented in accordance with the teachings set forth above. It is noted that the natural frequency of any such inductivebased network should be chosen sufficiently apart from the operating frequencies of the data bus so as to avoid undesirable resonances.

Figure 4:
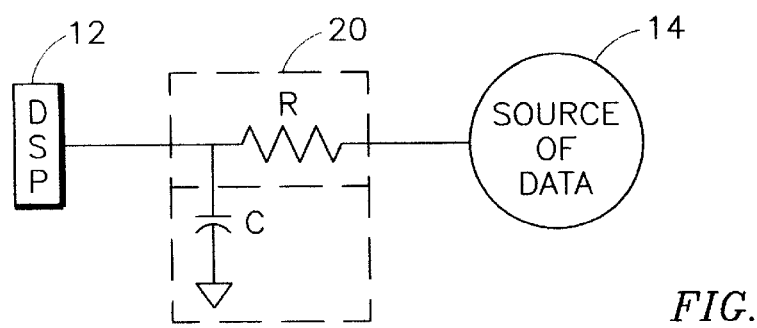
FIG. 4 shows further details regarding the circuit impedance of FIG. 3

FIG. 4 illustrates further details in connection with impedance 20 that allows for using the specific characteristics of the data bus as part of the interface solution. As will be appreciated by those skilled in the art, by determining the load capacitance contributed by DSP 12, data source 14, and any other devices coupled to the data bus as well as the intrinsic capacitance of the bus wiring itself, one can develop an analog interface, such as a lag network, between the DSP and the data source to provide the desired hold time compatibility between the DSP and the data source. In a preferred embodiment of the invention, a resistor is chosen as the isolation impedance. The actual value of the resistor may be calculated using techniques well-understood by those skilled in the art. For the exemplary assumptions described below, the value of the resistor R that satisfies the hold time conflict between a DSP having a data hold time specified to be two ns and a data source device specified to have a hold time of zero ns is 1.2 K ohm. For example, assuming that the total capacitance load on the bus is 30 pf and further assuming a first logic level of voltage, V1=0.4 V (e.g., half the logic level needed for a TTL-compatible input level), a second logic level of voltage, V0=3.6 V (e.g., a maximum driving voltage), and a time constant t=4ns (e.g., time constant t may be chosen to have a value corresponding to twice the specified hold time of the DSP), then, since the voltage transfer function is defined by V=V0*(1−e^(−t/RC), one may readily solve for the value of the resistor R based on Eq. 1) below:

$$R = (-t)/(C^* \ln((V0-V1)/V0)) \qquad \text{Eq. 1)}$$

It will be appreciated by those skilled in the art that the present invention is not limited to a single DSP or a single data source device, since the impedance coupled to the data bus may be readily segmented to handle multiple devices. Preferably, any impedance segmentation will be configured so that devices having a relatively slow hold time will be on one side of the isolation impedance and devices having a relatively fast hold time will be on the opposite side of the impedance.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A circuit for achieving hold time compatibility between data-source devices coupled to respective data-requesting device through a data bus, the circuit comprising:
   an impedance coupled to the data bus, the value of that impedance selected based on a respective capacitance in the data bus to introduce a selected delay to data passing therethrough.

2. The circuit of claim 1 wherein the respective capacitance in the data bus comprises at least the intrinsic capacitance of the data bus.

3. The circuit of claim 2 wherein the respective capacitance in the data bus further comprises any load capacitance contributed by the devices and the data-requesting device coupled to the data bus.

4. The circuit of claim 1 wherein the impedance coupled to the data bus comprises a resistor.

5. The circuit of claim 1 wherein the impedance coupled to the data bus comprises an inductor.

6. The circuit of claim 1 wherein at least one of the data-source devices comprises a respective memory.

7. The circuit of claim 1 wherein the hold time of the data-source device is specified to be less than the hold time required by the data-requesting device.

8. The circuit of claim 1 wherein the data-requesting device is a processor.

9. The circuit of claim 8 wherein the hold time of the data source-device is specified to be sufficiently fast relative to the hold time of the processor so as to give rise to hold time conflicts between the processor and the data-source device in the absence of the impedance coupled to the data bus.

10. The circuit of claim 1 wherein the hold time required by the data-requesting device is specified to be greater than that provided by the data-source device.

11. The circuit of claim 1 wherein the predetermined delay is selected to be sufficiently long so as to avoid any conflicts in the hold time of the data-source device and the data-requesting device.

12. A method for achieving hold time compatibility between data-source devices coupled to a respective data-requesting device through a data bus, the method comprising:
   coupling an impedance to the data bus, and
   selecting the value of that impedance based on a respective capacitance in the data bus to introduce a selected delay to data passing therethrough.

13. The method of claim 12 further comprising a step of estimating a value of the intrinsic capacitance of the data bus.

14. The method of claim 13 further comprising a step of estimating a value of load capacitance contributed by the devices and the data-requesting device coupled to the data bus.

15. The method of claim 14 wherein a value of the respective capacitance in the data bus comprises the estimated value of the intrinsic capacitance of the data bus and the estimated value of the load capacitance contributed by the devices and the data-requesting device coupled to the data bus.

16. The method of claim 12 wherein the impedance coupled to the data bus comprises a resistor.

17. The method of claim 12 wherein the impedance coupled to the data bus comprises an inductor.

18. The method of claim 12 wherein at least one of the data-source devices comprises a respective memory.

19. The method of claim 12 wherein the hold time of the data-source device is specified to be less than the hold time required by the data-requesting device.

20. The method of claim 12 wherein the data-requesting device is a processor.

21. The method of claim 20 wherein the hold time of the data source-device is specified to be sufficiently fast relative to the hold time of the processor so as to give rise to hold time conflicts between the processor and the data-source device in the absence of the impedance coupled to the data bus.

22. The method of claim 12 wherein the hold time required by the data-requesting device is specified to be greater than that provided by the data-source device.

23. The method of claim 12 wherein the predetermined delay is selected to be sufficiently long so as to avoid any conflicts in the hold time of the data-source device and the data-requesting device.

* * * * *